Jan. 29, 1957   F. W. HOTTENROTH, JR   2,779,095
METHOD OF MAKING A BELLOWS ASSEMBLY
Filed Dec. 23, 1953

*INVENTOR.*
FREDERICK W. HOTTENROTH, JR.

BY
ATTORNEYS

2,779,095
Patented Jan. 29, 1957

United States Patent Office

2,779,095
METHOD OF MAKING A BELLOWS ASSEMBLY

Frederick W. Hottenroth, Jr., Newton, Mass., assignor to Standard-Thomson Corporation, Boston, Mass., a corporation of Delaware Application December 23, 1953, Serial No. 399,883

1 Claim. (Cl. 29—454)

The present invention relates to a method of making a bellows assembly having its component parts joined together and sealed by welding. More particularly, it relates to a valve assembly adaptable for use in a steam trap, and to a method for fabricating the assembly.

The invention consists in certain improvements in the assemblies and methods disclosed in Patent Nos. 1,842,657 and 1,992,605. These patents show steam traps of the type including a casing having formed therein a chamber and inlet and outlet channels communicating with the chamber. The chamber has a valve seat in the outlet channel and an external opening over the valve seat into which the valve unit is received. The valve unit includes a flexible metallic bellows, a threaded cap portion secured to an end of the bellows which closes and seals the opening, and a valve plug attached to or integral with the other end of the bellows, and supported in position to move against the valve seat in the outlet channel when the bellows is extended. In an assembly of this kind, the bellows is ordinarily filled with a few drops of water which vaporizes and causes the valve to close when the temperature is sufficiently high.

In the conventional assembly described above, the valve assembly is soldered both at the end of the bellows where it is joined to the threaded cap portion and at the filling hole, which is located in the tip of the valve plug. This entails exposure of the soldered joints to direct contact with steam and condensate. Moreover, the exposure alternates between contact with steam and contact with colder condensate, in accordance with the frequency at which the trap opens and closes. The fatigue action of this alternating exposure, coupled with the corrosive chemical action resulting at steam temperatures from the joining of the solder with dissimilar metals, tends in time to weaken the soldered joints and to cause failure. As a matter of economy and convenience, the valve assembly is ordinarily replaced as a unit when worn out; and for this reason the cost of manufacture of the assembly, which ordinarily includes a forging for the cap portion, is a factor of some concern, and one which can be reduced only by provision of a cheaper type of structure with equal or greater reliability.

A further difficulty in the fabrication of valve assemblies according to the existing practice of soldering results from the necessity of using a flux. After a soldering operation, it is ordinarily necessary to wash the parts in an appropriate solution to remove any flux which may have become deposited either within the bellows or upon any of the other parts. In mass production of the valve units, the additional washing step or steps account for a significant part of the total cost per unit.

It is an object of the present invention to provide a bellows assembly of simple, low cost construction, having improved durability and dependability and eliminating some of the objectionable features of existing methods and practice.

More specifically, one object is to provide an assembly in which soldered seals or joints are either entirely eliminated or completely shielded from direct contact with steam or condensate within the steam trap.

A further object is to provide an improved structure in which the replaceable parts are fabricated by the cheaper process of stamping, rather than by forging, as in the case of the threaded cap closures of the above-described patents.

With these and other objects in view, a feature of this invention resides in a bellows assembly including a metallic bellows having at one end a cylindrical neck portion, an inner flanged member fitted within the neck, and an outer flanged member received over the neck, the said members and bellows being of substantially similar metal, and being fused together, preferably by electric inert arc welding in which no weld metal is added to the joint. By this means, the chemical action caused by joints between dissimilar metals is eliminated.

As a further feature, the soldered filling hole for the bellows is either located upon the end which is protected by the weld from contact with the steam or condensate, or else entirely eliminated by a novel method in which the assembly is welded together while immersed in water. The arrangement of the various parts of the assembly lends itself well to this latter method, in which a single annular weld joins the three component parts, and simultaneously seals the bellows. The water in which the assembly is immersed rapidly draws away the heat generated by the arc, thus preventing the water which has been placed in the bellows prior to sealing from vaporizing and escaping.

Other features of the invention comprise certain combinations, structures and methods of fabrication which will be more clearly understood with reference to the following description thereof, to the appended claim, and to the accompanying drawings in which:

Figure 1:
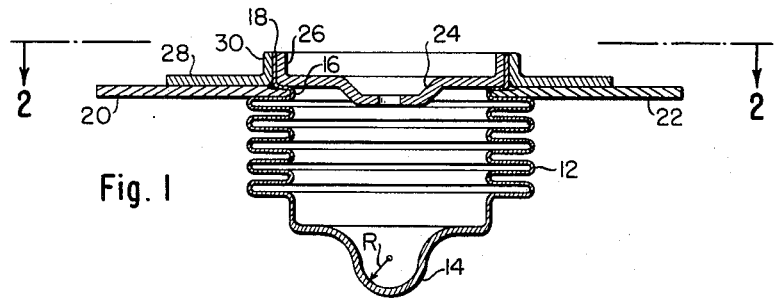
Fig. 1 is a longitudinal elevation in section illustrating the partially completed assembly of the component parts comprising the replaceable valve assembly.

Referring to Fig. 1, the valve assembly includes a closed ended metallic bellows 12 having the usual thin-walled, flexible convolutions. The closed end 14 is ordinarily of thicker metal and is formed in a die to have an appropriate contour to fit the valve seat in the casing. The radius R which determines the curvature of the portion 14 may be chosen in accordance with usual design practice. The plug portion may also have alternative shapes, such as the truncated conical shapes shown in the above-described patents.

At its open end the bellows has a partial convolution 16 which constitutes a terminating inner fold and a short cylindrical neck portion 18 of a diameter intermediate between the diameters of the inner and outer folds of the full-sized convolutions.

Figure 2:
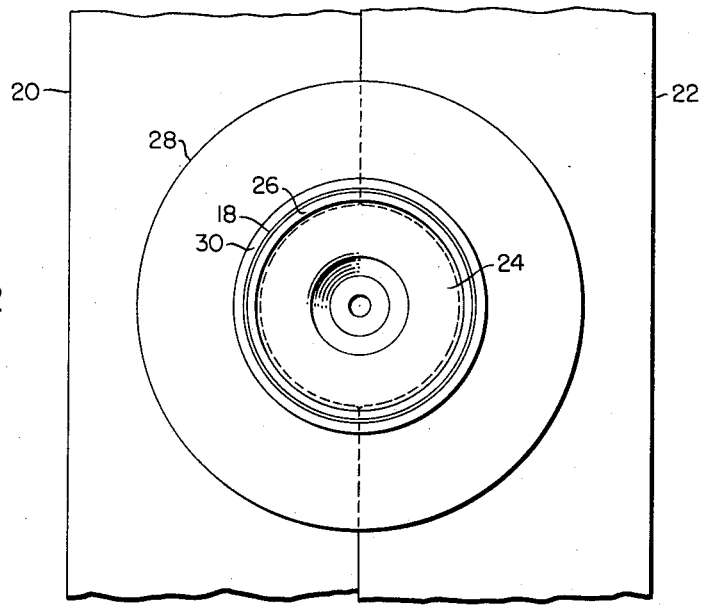
Fig. 2 is an end elevation taken on line 2—2 of Fig. 1.

Prior to assembly of the other parts to the bellows, a pair of divisible plates 20 and 22 having therein semi-circular openings of a diameter approximately equal to the inner diameters of the convolutions, are closed together by fitting them within the end convolution as illustrated in Figs. 1 and 2. With the bellows thus supported, a flanged inner member 24 having a central filling hole is received within the neck portion 18 so that it rests upon the seat afforded by the partial convolution 16. Preferably, the curve joining the central portion of the member 24 and the flange 26 is substantially the same as that of the adjacent portion of the bellows, as illustrated.

An outer flanged member 28 is received over the neck portion 18 of the bellows, so that its flange 30 lies adjacent the neck 18. The member 28 is seated against the surfaces of the plates 20 and 22, the latter being firmly secured together by any suitable, readily demountable means.

Next, the two flanged members and the bellows are firmly secured together and sealed, preferably by an electric arc weld in which the arc is passed between the electrode and the joint through an envelope of inert gas ejected from a suitably placed nozzle. This method, commonly known as "inert arc welding," utilizes one or preferably a combination of gases such as argon and helium in suitable proportions to prevent oxidation of the parts as they are melted, fused, and co-mingled to form a relatively homogeneous weld including some metal of each of the joined parts. Thus, unlike soldering, no flux is required or used, and the necessity for cleaning obviated.

During the welding step, the bellows is vented through the filling hole in the member 24. Once the welding step has been completed, the appropriate quantity of fluid, such as a few drops of water, is placed within the bellows, and a fill pin 32 having a slight taper is dropped into the hole. The pin and the member 24 are then soldered at 34 to seal the bellows.

The unit thus assembled comprises the replaceable valve assembly for the steam trap. It will be noted that it is composed of relatively inexpensive parts, and does not include forgings or threaded parts. The members 24 and 28 and the bellows 12 are preferably chosen of like metals, so that to the extent that their joint is exposed to steam or condensate there will be no corrosive chemical action of the type heretofore mentioned. The plates 20 and 22 are used only for purposes of assembly and welding, and form no part of the final valve unit.

Figure 3:
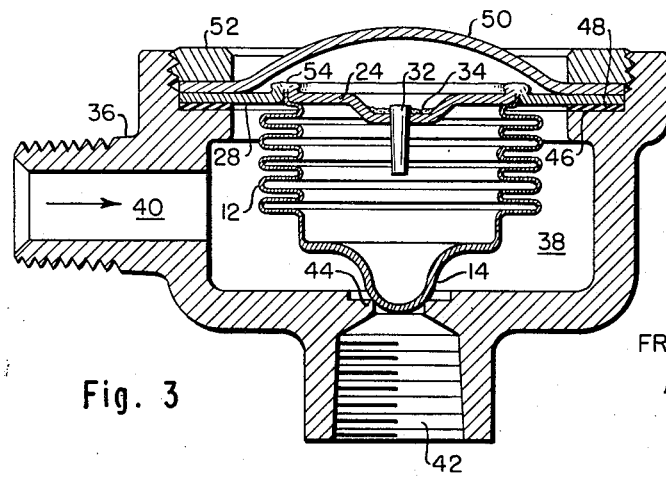
Fig. 3 is an elevation in section of a steam trap incorporating the valve assembly.

Fig. 3 illustrates a steam trap adapted to receive a valve assembly of the type described. The trap consists essentially of a casing 36 having formed therein a chamber 38, an inlet channel 40 communicating with the chamber, an outlet channel 42 communicating with the chamber through a valve seat 44, and the valve assembly itself. Immediately above the valve seat 44 the casing has a circular threaded opening and an inner ledge 46 upon which is seated a gasket 48 of rubber or the like. The gasket is chosen of material suitable to withstand contact with the steam and condensate.

The valve assembly is received into the external opening of the casing and seated upon the gasket 48. In this manner, the plug portion 14 of the bellows is accurately located in relation to the valve seat 44. Over the valve assembly there is then placed a curved plate 50, which has a flat peripheral portion adapted to lie against the flanged member 28 near its edge, and which contains a curvature toward the center sufficient to clear the bead of the weld, approximately as illustrated. In addition to protecting the valve assembly, the plate 50 can be used to display marks, stampings, or other indicia, such as an identification of the make or lot number of the valve member, or its date of replacement.

An externally threaded locking ring 52, preferably having an inner polyhedral face, securely clamps the plate 50 and the flange 28 in place.

It will be noted that according to this construction the only soldered connection, which is at the fill pin 32, is entirely isolated from contact with the steam or condensate within the chamber 38. Moreover, the weld at 54 is also almost entirely excluded from contact with corrosive agents. The only possible area of contact is at the side of the weld adjacent the bellows, since the seal 48 prevents the escape of steam to the other side. But even in the event that some steam or condensate should come into contact with a portion of the weld, there will be no consequent corrosive chemical action, and the joint will remain strong and dependable for a long period of time.

According to a variant of the above process of fabrication of the valve unit, it is possible to eliminate entirely the fill pin 32 and the solder at 34. In this case, the inner flanged member 24 has no filling hole whatever, and completely seals the bellows when it is welded thereto. The fill fluid is placed in the bellows prior to the welding step, rather than subsequently as in the previously described process.

This latter process is as follows. First, the appropriate quantity of fluid such as water is placed within the bellows, preferably after the plates 20 and 22 are assembled and locked together around the end partial convolution 16, and the inner imperforate flanged member and outer flanged member are placed about the neck portion 18 as previously described. Next, the assembly is immersed in water, where it remains until the weld has been completed.

The welding process is similar to that described above, and involves generation of an electric arc enveloped in a stream of inert gas ejected into the water adjacent the parts to be welded. In this case as in the previous one, the assembly is preferably rotated with respect to the electrode or the electrode with respect to the assembly, at a steady rate so as to produce a clean, uniform bead. The water serves to draw the heat generated at the weld rapidly away from the assembly so as to prevent vaporization of the fill within the bellows and consequent loss thereof through leakage around the remaining unwelded section of the joint. Thus, the process of assembly, filling and sealing of the valve assembly is further shortened and simplified.

It will be understood that while the invention has been described with reference to certain preferred structures, methods and procedures as applied to the fabrication of steam trap valve assemblies, it is by no means limited thereto, but encompasses such modifications or variations of design, arrangement, method or structure as may be added to or substituted in the structure and process disclosed herein by one skilled in this art, without departing from the spirit or scope of the invention.

Having thus described the invention, I claim:

The method of fabricating an assembly including as one element thereof a metallic bellows having a terminating inner fold and an open generally cylindrical end section adjacent to said terminating fold, which comprises the steps of supporting the bellows by means of a plurality of plate members fittingly inserted between said terminating inner fold and the adjacent outer fold, fitting an inner flanged member within said end section so that it rests upon said terminating inner fold, fitting an outer flanged member over said end section so that it rests upon said plate members, whereby the flanges of said flanged members are aligned with and fitted to said end section, and welding said flanges and the end section by a continuous annular weld.

References Cited in the file of this patent

UNITED STATES PATENTS

| | | |
|---|---|---|
| 899,656 | Burnet | Sept. 29, 1908 |
| 1,366,473 | Mallory | Jan. 25, 1921 |
| 1,992,605 | Clifford | Feb. 26, 1935 |
| 2,214,236 | Seldon | Sept. 10, 1940 |
| 2,250,362 | Dube | July 22, 1941 |

FOREIGN PATENTS

| | | |
|---|---|---|
| 101,256 | Great Britain | Aug. 31, 1916 |